(12) United States Patent
Casper et al.

(10) Patent No.: US 10,084,664 B1
(45) Date of Patent: Sep. 25, 2018

(54) DYNAMIC CONFIGURATION OF A SCROLL FEATURE

(71) Applicant: INTERNATIONAL BUSINESS MACHINES CORPORATION, Armonk, NY (US)

(72) Inventors: Michael Casper, Gretna, NE (US); James V. Clements, Perkasie, PA (US); Ryan D. Helmoski, Windom, MN (US); Naijun Yang, Flushing, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/465,214

(22) Filed: Mar. 21, 2017

(51) Int. Cl.
| | |
|---|---|
| H04B 1/18 | (2006.01) |
| H04L 12/24 | (2006.01) |
| H04M 1/02 | (2006.01) |
| H04W 4/20 | (2018.01) |
| H04L 12/26 | (2006.01) |

(52) U.S. Cl.
CPC .......... *H04L 41/5009* (2013.01); *H04L 41/22* (2013.01); *H04L 43/16* (2013.01); *H04M 1/0202* (2013.01); *H04W 4/20* (2013.01)

(58) Field of Classification Search
CPC .......... G06F 3/0485; G06F 3/041; G06F 8/38; G06F 17/30899
USPC .................. 455/3.06, 414.1, 405, 566, 158.4
See application file for complete search history.

(56) References Cited

U.S. PATENT DOCUMENTS

| | | |
|---|---|---|
| 6,658,462 B1 | 12/2003 | Dutta |
| 7,742,418 B2 | 6/2010 | Westerberg et al. |
| 8,751,953 B2 | 6/2014 | Forstall |
| 8,965,963 B2 | 2/2015 | Evans et al. |
| 2012/0159393 A1 | 6/2012 | Sethi |
| 2014/0122590 A1* | 5/2014 | Svendsen ............. H04N 21/252 709/204 |
| 2014/0208259 A1 | 7/2014 | Desai |
| 2015/0317309 A1 | 11/2015 | Farrell et al. |
| 2016/0078005 A1 | 3/2016 | Soos |
| 2017/0223124 A1* | 8/2017 | Dhawan .................. H04L 67/22 709/224 |

* cited by examiner

*Primary Examiner* — Tu X Nguyen
(74) *Attorney, Agent, or Firm* — Conley Rose, P.C.

(57) ABSTRACT

A client device (e.g., smart phone) submits scroll log data to a server. The scroll log data comprises time stamps of load start events, load end events and lag events. The server then computes a performance value using the scroll log data and, responsive to the performance value, adjusts a first scroll parameter for use by client devices. The server also transmits the adjusted first scroll parameter to the client device for use in a graphical user interface scroll on an application executing on the client device. The server then transmits data to the client device in response to the client device's use of the adjusted first scroll parameter.

17 Claims, 4 Drawing Sheets

US 10,084,664 B1

DYNAMIC CONFIGURATION OF A SCROLL FEATURE

STATEMENT REGARDING FEDERALLY SPONSORED RESEARCH OR DEVELOPMENT (IF APPLICABLE)

Not applicable.

STATEMENT REGARDING PRIOR DISCLOSURES BY THE INVENTOR OR A JOINT INVENTOR (IF APPLICABLE)

Not applicable.

BACKGROUND

The present disclosure relates to improving performance of executable applications, and more specifically, to monitoring the scroll performance of scroll features within an executable application and dynamically configuring various parameters for an electronic device to use when implementing the scroll feature.

To stay competitive in the digital world and retain customer loyalty, application developers should continuously make customer experience improvements on their executable applications. However, identifying areas of improvement and implementing the solutions is time-consuming and resource-intensive. Application developers may track a variety of data sources on a daily basis, but secondary sources such as application reviews are difficult to find and often do not offer actionable feedback. Primary research such as user interviews takes a long time to complete, and are expensive to conduct. Furthermore, to continuously deploy improvements to enhance the users' experience, application developers may rely on a development team who are often resource-constrained, meaning user experience improvements are often delayed.

SUMMARY

A client device (e.g., smart phone) submits scroll log data to a server. The scroll log data comprises time stamps of load start events, load end events and lag events. The server then computes a performance value using the scroll log data and, responsive to the performance value, adjusts a first scroll parameter for use by client devices. The server also transmits the adjusted first scroll parameter to the client device for use in a graphical user interface scroll on an application executing on the client device. The server then transmits data to the client device in response to the client device's use of the adjusted first scroll parameter.

In another embodiment, a system includes one or more central processing units (CPUs) coupled to a storage device. The storage device includes an executable scroll log analyzer. When executed by the one or more CPUs, the scroll log analyzer is configured to receive scroll log data from a client device. The scroll log data includes time stamps of load start events, load end events and lag events recorded by the client device. The scroll log analyzer also is configured to compute a performance value using the scroll log data, determine that the performance value is outside a limit, adjust a first scroll parameter for use in a graphical user interface scroll on an application executing on the client device, and cause the adjusted first scroll parameter to be transmitted to the client device.

Yet another embodiment includes a computer program product for adjusting the configuration of a computing device. The computer program product comprises a computer readable storage medium having stored thereon various program instructions. First program instructions are provided to receive scroll log data from a client device, wherein the scroll log data includes timestamps of load start events, load end events and lag events recorded by the client device, wherein the timestamps of load start events indicate when the client device requests additional data, the timestamps of load events indicate when the requested additional data has been received, and the timestamps of lag events indicates when the client device has reached the end of a buffer of data and is waiting on the requested additional data. Second program instructions compute a performance value using the scroll log data. Third program instructions determine that the performance value is outside a limit. Fourth program instructions adjust a first scroll parameter for use in a graphical user interface scroll on an application executing on the client device. Fifth program instructions cause the adjusted first scroll parameter to be transmitted to the client device.

DETAILED DESCRIPTION

In accordance with various embodiments, a client device executes an application that has a scroll feature, that is, a user interface that permits a user to selectively view content that is more voluminous than what can be shown on the client device's display at one time. The user can scroll down through the content. The content is transmitted by a server to the client device in subsets of data at a time by a corresponding server application. When the client device is about to display the end of the current subset of data, the client device submits a request to the server application for the next subset of data. If the next subset is not provided to the client device before the user attempts to continue scrolling past the end of the former subset, the client application will be forced to pause while the next subset of data is being received.

The server computes a performance value using scroll log data from the client devices. Upon determination that a performance value is outside a range of acceptability, the server may adjust one or more parameters related to the operation of the scroll feature on the client application. One such parameter may be the size of a buffer which identifies the point at which the client device requests the next subset of data from the server. A larger buffer size causes the client device to request the next subset of data from the server while there remains even more data on the client device yet to be viewed in the scroll feature. An additional parameter that may be adjusted is the amount of data that the server transmits to the client device when the next subset of data is requested. The embodiments described herein permit the client device and client device-server interaction to function more efficiently and with fewer undesirable lag events.

Figure 1:
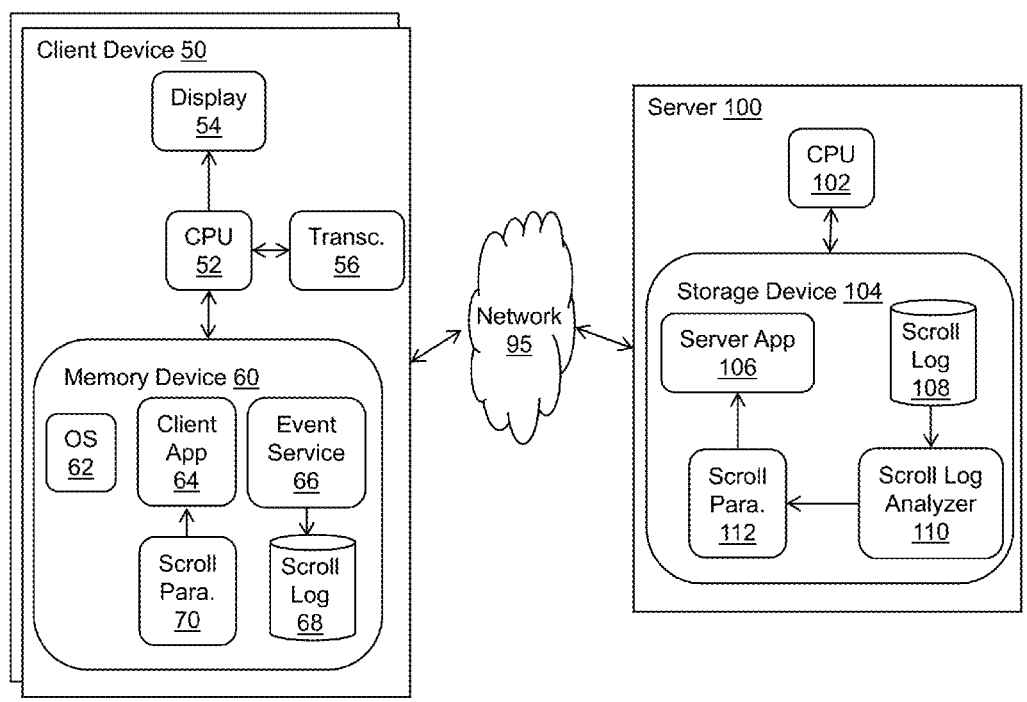
FIG. 1 illustrates a system in accordance with various embodiments.

The example of FIG. 1 illustrates one or more client devices 50 coupled to a server 100 via a network 95. The client devices may be portable devices (e.g., smart phones), tablet devices, personal computers (e.g., notebooks, desktops, etc.), personal digital assistants, or other types of electronic devices. The various client devices 50 may be the same or different. For example, one client device may be a smart phone while another client device is notebook computer. The network 95 may include one or more of a cellular network, local area networks, wide area networks, wired networks, wireless networks, etc.

FIG. 1 illustrates a representative architecture of a client device 50, although other implementations are possible as well. Each client device 50 includes one or more CPUs 52 coupled to a display 54, a transceiver 56 and a memory device 60. The display 54 may be a touch sensitive display, but can be a non-touch sensitive display in other embodiments. The transceiver 56 provides the client device 50 with connectivity to the sever 100 and other remote devices. The transceiver 56 may be a wireless transceiver or a wired transceiver.

The memory device 60 may be non-volatile and comprise a single memory device or multiple memory devices. The memory device 60 may include an operating system 62, a client application 64, an event service 66, a scroll log 68, and a scroll parameter 70. The operating system 62, client application 64, and event service 68 are executed by the CPU 52. Although one client application 64 is shown in FIG. 1, any number of applications can be included. Each client application 64 performs whatever functionality the developer of the application intended.

Client application 64 may include a scroll feature that allows a user of the client device to scroll through content rendered on the display 54. The content may comprise a list of information items or other types of information or data that the user may want to view on the display 54. The amount of data may be more than can be displayed at one time on display 54. As such, the user is only able to see a portion of the total amount of data. In the embodiment in which the display is a touch display, the user can use a finger or a stylus to swipe up or down (or left/right) to scroll the data. Alternatively, the user may use a pointing device such as a mouse to click on a scroll bar slider element or rotate a wheel on the mouse to perform the scroll function.

The server 100 includes one or more CPUs 102 coupled to a storage device 104. The storage device 104 may include a server application 106, a scroll log 108, a scroll log analyzer 110, and a scroll parameter 112. The server application 106 may comprise the server portion of the application 64. That is, the functionality performed by the application may be divided between the client application 64 and the server application 106. For example, the server application 106 may transmit data over network 95 to the client device 50 for rendering by client application 64 on a display 54.

Figure 2:
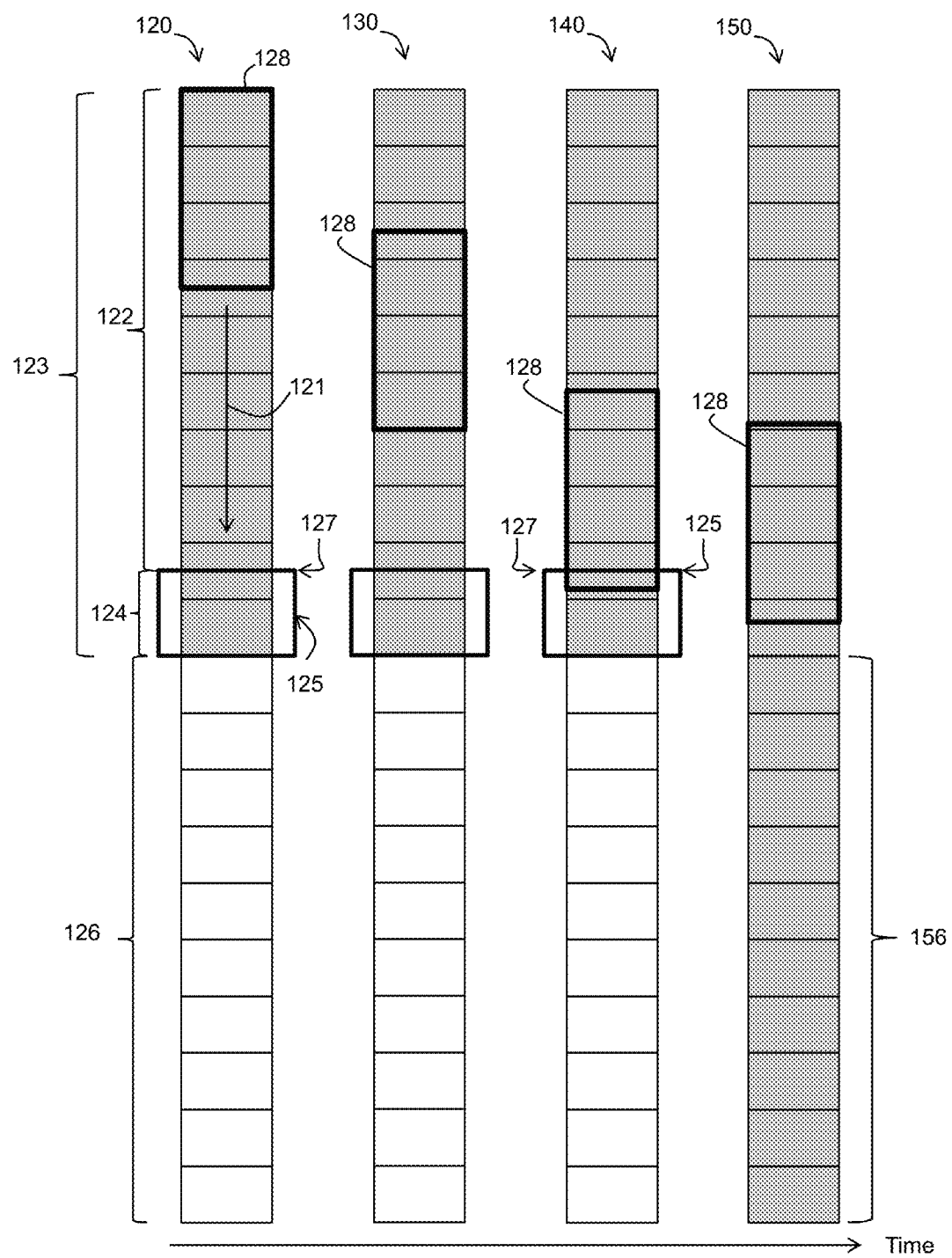
FIG. 2 illustrates various example of the interaction between a client device and a server in accordance with various embodiments.

The data transmitted by the server 100 to the client device 50 for rendering on display 54 in a scroll feature may be transmitted to the client device in subsets. FIG. 2 illustrates this process. FIG. 2 shows a time sequence of events pertaining to a scroll feature. Each block represents data that is transmitted by the server 100 to the client device 50 for rendering on the display. Each block may be defined in terms of a number of bytes, number of pixels worth of data, etc. The shaded blocks represent data that has been transmitted from the server 100 to the client device 50 and the unshaded blocks represent additional that the server has for the client application but that has not yet been transmitted to the client device.

At 120, the client application has received data 123 but not data 126. Dark rectangle 128 represents a "view port," that is, the data that is currently rendered on the client device display 54. As the user scrolls down in the direction of arrow 121, the view port 128 "moves" down as well to show additional received data 122 that had yet been displayed to the user as shown at 130.

Data 124 defines a buffer 125. Data 124 is data that has already been transmitted by the server 100 and received by the client device but is not displayed to the user on display 54 until the user uses the client application 64 to scroll down into the buffer 125. The first portion of the data in buffer 125 to be accessed by the user during a scroll event is identified by arrow 127. At time sequence 140, when the user has scrolled down far enough that the view port 128 enters the buffer 125, at 127 the client application 64 responds by submitting a request to, or otherwise signaling, the server application 106 to transmit an additional batch (subset) of data. Time sequence 150 illustrates that additional data 156 has been transmitted from the server 100 to the client device 50 in response to the view port 128 reaching the buffer 125.

In general, there will be a lag between the time the view port 128 reaches the buffer 125 and the time that the additional batch of data 156 has been received by the client device and can be displayed on display 54. The lag may be caused by a variety of factors including, for example, latency across network 95, latency of the server 100 and server application 106 to respond to the request for an additional batch of data, loss of signal by client device 50 (e.g., a smart phone that temporarily loses the wireless signal), etc. If the lag is long enough, the view port 128 may reach the bottom of the buffer 125 before the next batch of data 156 is received by the client device 50 and is ready to be displayed. When that happens, the user notices the lag as his or her client device is unable to continue scrolling down through the data. Eventually, however, the next batch of data 156 is received by the client device and the client application 64 continues rendering the newly received batch of data.

In some embodiments, the client application's scroll feature is configurable in one or more regards. For example, the size of buffer 125 can be configured as the batch size of data to be transmitted from server to client device. A larger size for buffer 125 means that more data will be resident on the client device 50 for viewing in view port 128 and thus more time is available for the next batch of data to be transmitted by the server and received by the client device. Further, a larger batch size means that the client device will need to request an additional batch of data less frequently.

Referring again to FIG. 1, in accordance with the disclosed embodiments, the client device 50 is configured to record metadata and timestamps about a scroll event. A scroll event may be a user interacting with the client application (e.g., via a touch display) to swipe his or her finger in a direction to scroll through the data pertaining of the client application 64. The client device 50 of the example of FIG. 1 includes an event service 66 which may be built into the operating system 62 or may be a service that is separate from the operating system. The event service may be used to attach an event listener to the scroll feature of the client application. The event listeners may be configured to detect certain events and record timestamps upon the detection of such events. The event service 66 can be configured by any application to monitor any of numerous types of events relevant to the application. For example, the event service 66 can be used to record a timestamp each time the user initiates a scroll event. The event service 66 also can record:

- a timestamp when the view port 128 enters the buffer 125 and triggers the transmission of an additional batch of data from the server 100 to the client device (termed a "load start event");
- a timestamp when the requested batch of data is received by the client device (termed a "load end event"); and
- a timestamp for if and when the view port 128 reaches the end of the buffer without the next requested batch of data having been received (also termed a "lag event").

The event service 66 stores the timestamps in scroll log 68. The scroll log 68 may contain a record for each scroll event and the record may include metadata about the scroll event as well as the timestamps listed above. There may or may not be a lag event—if the next batch of data is received by the client device before the user attempts to view the end of the buffer 125 then there will be a lag event, but no lag event otherwise. Unless the buffer 125 happens to already contain the data at the very end of all of the data to be viewed through the client application 64, there should be timestamps for both load start and load end events.

As noted above, each record in the scroll log 68 may contain metadata in addition to the timestamps. The metadata may include any one or more of the following items of information:

- Identifier of a scroll feature of the client application 64. Some client applications may have multiple scroll features (e.g., different user views in which scrolling is possible to access different types of data). Each such scroll feature may be assigned a unique identifier.
- Identifier of the operating system 62
- Version identifier of the operating system 62
- Identifier of the client application 64
- Version identifier of the client application 64
- Identifier of the client device 50
- Device display resolution Different or additional types of metadata are possible as well. The scroll log 68 from each client device 50 may be transmitted over network 95 to the server 100 and analyzed thereon by the scroll log analyzer. The metadata may be used to parse the timestamp values as appropriate. For example, the client device's scroll log data may comprise scroll records for different client applications 64 and each client application's scroll records may be separately analyzed. Further, if a client application 64 has multiple scroll features, the scroll records for each such scroll feature may be separately analyzed. In some cases, the client device 50 initiates the upload of the scroll log 68 to the server 100, and in other embodiments, the server 100 initiates the upload. In some cases, the scroll log 68 may be uploaded at preconfigured time intervals (once per hour, once per day, etc.) or the scroll log 68 may be uploaded upon the log having a predetermined number of records or a predetermined amount of data to be analyzed.

In accordance with the disclosed embodiments, the scroll log analyzer 110 may be executed on the same server that executes the sever application 106, but can be executed on a different server in other embodiments. In some embodiments, the scroll log analyzer may be implemented on the client devices themselves. The scroll log analyzer 110 may compute a performance value using the uploaded scroll log. The scroll log analyzer 110 may compute the performance value from the scroll log of a single client device (i.e., a different performance value for each client device), or the scroll log analyzer 110 may aggregate multiple client devices' scroll logs 68 for analysis. Further, the scroll log analyzer can analyze the scroll log records of individual applications.

In one example, the scroll log analyzer 110 may determine the percentage of scroll events that result in a lag event. That is, the scroll log analyzer 110 counts the number of instances in which scroll log records indicate the existence of load start and load end events (i.e., the total number of scroll events). The scroll log analyzer 110 also counts the number of those records that have a timestamp for a lag event. The ratio of the number of lag events to the total number scroll events indicates the percentage of the scroll events that undesirably resulted in a lag. The scroll log analyzer 110 may compare that ratio (or percentage) to a predetermined or configurable threshold value (e.g., configurable by the developer of the client application 64). If the lag event ratio is greater than the threshold (indicative of an excessive number of lag events), the application developer may adjust the scroll parameters for the application. In some embodiments, the results of the scroll log analyzer 110 may be viewed by the application developer on a display or workstation (not shown) coupled to the server 100. In other embodiment, the scroll log analyzer may dynamically and automatically (i.e., without human input) adjust the scroll parameters.

As noted above, one scroll parameter may comprise the buffer size and another scroll parameter may comprise the size of each transmitted batch of data. In one embodiment, the buffer size scroll parameter may be stored as scroll parameter 70 in the client device 50 and the batch size scroll parameter may be stored as scroll parameter 112 on the server. In another embodiment, both scroll parameters are stored on the client device 50, and in yet another embodiment both scroll parameters are stored on the server 100. The scroll log analyzer 110 may dynamically adjust either or both of the buffer and batch size scroll parameters and transmit them, if applicable, to the client device or store them on the server for use by the server application 106.

Figure 3:
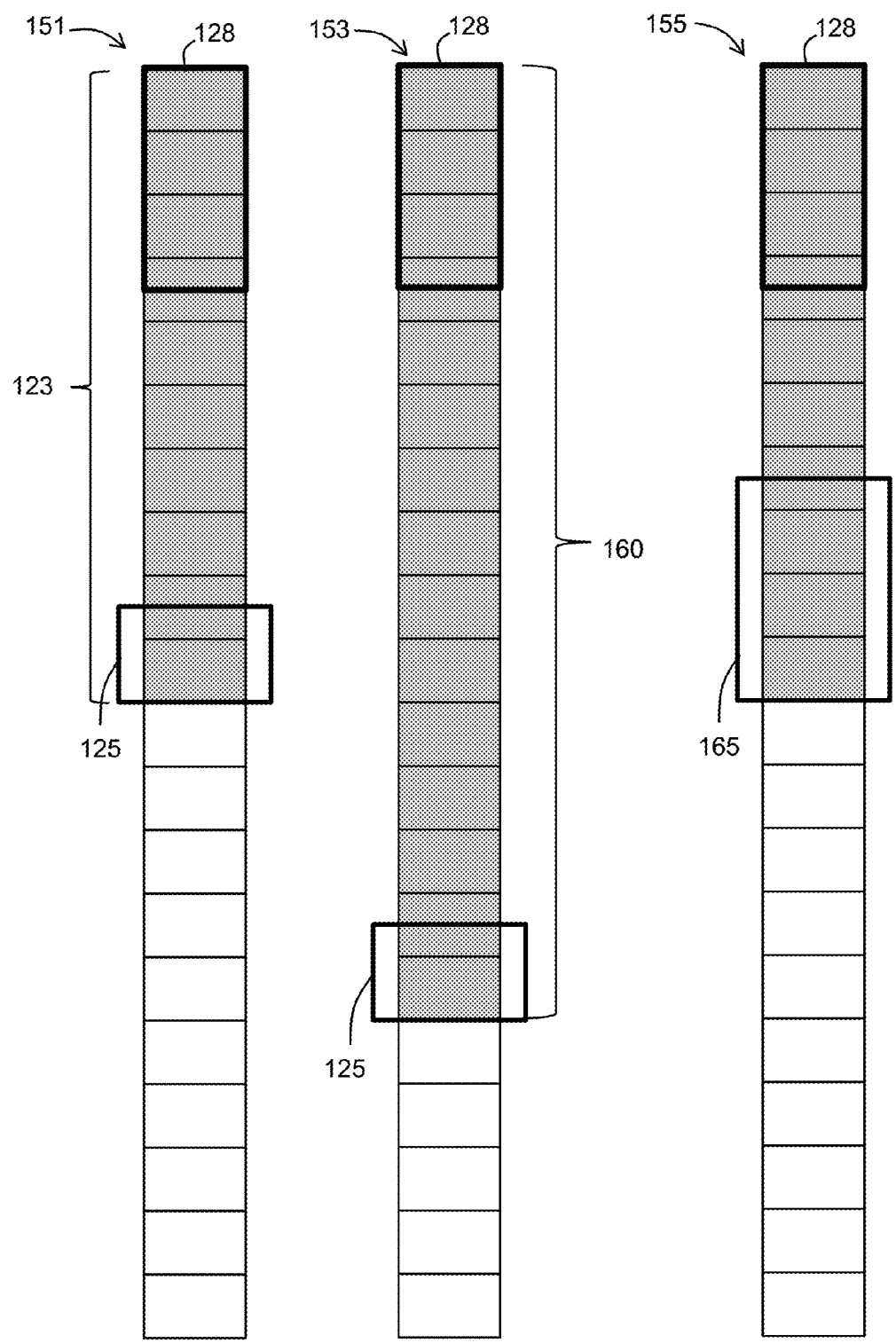
FIG. 3 illustrates the adjustment of various scroll parameters in accordance with various embodiments.

FIG. 3 illustrates the adjustment to the scroll parameters. At 151, data is shown with a buffer size and a batch size that are set at particular values corresponding to buffer 125 and batch received data 123. At 153, the buffer size scroll parameter remains the same, but the batch size has increased as indicated by reference numeral 160. At 155, the batch size is the same, as at 151, but the buffer size has increased as illustrated by buffer 165 being larger than buffer 125.

In one embodiment, the buffer size scroll parameter is adjusted by the scroll log analyzer 110 and transmitted to the client device 50 where the client application implements the buffer size parameter to determine when to request additional scroll data from the server application 106. The batch size scroll parameter may be implemented on either client device or the server. If implemented on the client device, the client application 64 requests the next batch of data when the view port reaches the buffer, and the request includes an identifier of the amount of data to be transmitted (i.e., the batch size). In the case in which the server 100 implements the batch size scroll parameter, the client application may request the next batch of data, but the server application, using the batch size, determines how much data to transmit.

Figure 4:
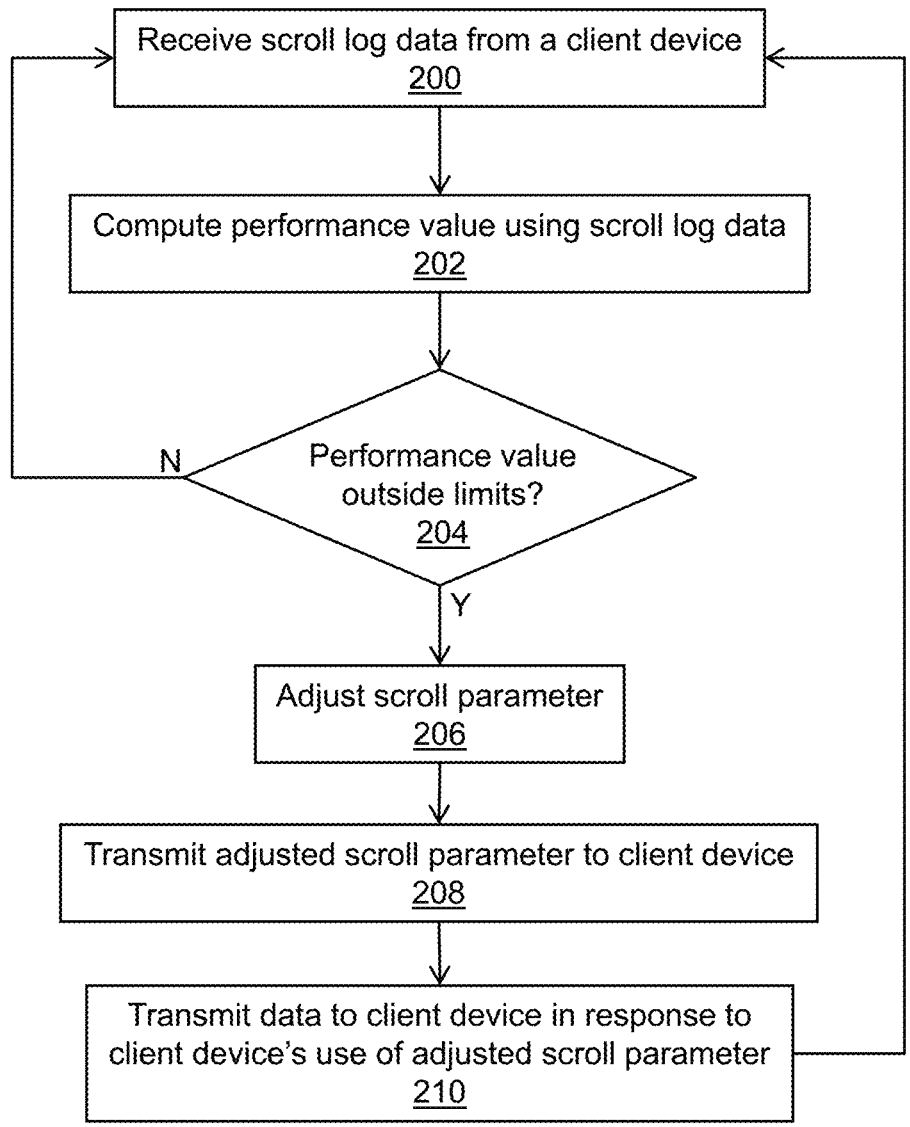
FIG. 4 illustrates a method in accordance with various embodiments.

FIG. 4 illustrates a method in accordance with various embodiments. The operations may be performed in the order shown or in a different order. Further, the operations may be performed sequentially or two or more of the operations may be performed concurrently. At 200, the method includes receiving scroll log data from a client device 50. The scroll log data may be transmitted by the client device in response to receipt of a request by the server.

At 202, the method includes computing a performance value using the scroll log data. An example of a performance value is provided above and may comprise a ratio of the scroll events that resulted in a lag event. At 204, the method comprises determining whether the performance value is outside the prescribed limits. If it is not, control loops back to 200 and the process repeats at intervals as mentioned above. Otherwise, if the performance value is outside the prescribed limits, then at 206, the method comprises adjusting one or more scroll parameters (buffer size, batch size, etc.). The scroll parameters may be adjusted in discrete predefined increments. Any of a number of machine learning algorithms could be used (e.g., reinforcement learning), although manual adjustment of the scroll parameters may be performed as well.

Under reinforcement learning, an agent attempts to maximize a reward function, which is calculated based on transitions between states of the environment and agent. These transitions between states are caused by the actions taken by the agent given the current state. The agent selects an action to perform out of several possible actions based on its past experience as well as its curiosity (represented as a parameter in the algorithm) and propensity for short-term versus long-term rewards (another parameter) all in the pursuit of maximizing its rewards. In accordance with various embodiments, the states could be the current values of the scroll parameters (e.g., batch size, buffer size). The actions that could be taken could be increasing, decreasing, or maintaining each scroll parameter. Further, the reward could be given by the resulting performance value. Thus, the agent would attempt to optimize the performance value over time by adjusting the scroll parameters.

An adjusted scroll parameter (or multiple scroll parameters) may be transmitted to the client device at 208. At 210 data is transmitted by the server 100 to the client device 50 in response to the client device's use of the adjusted scroll parameter(s). Control loops back to 200 and the process repeats. The process thus may be an iterative process in which the scroll parameters are incrementally adjusted until no further adjustments are necessary. In some embodiments, all client devices executing the same client application are configured to have the same values of the scroll parameters. In other embodiments, individual instances of the client applications may be separately configured.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a server, scroll log data from a client device, wherein the scroll log data includes time stamps of load start events, load end events and lag events;
   computing a performance value using the scroll log data by computing a ratio of a number of scroll events that include a lag event to a total number of scroll events;
   responsive to computing the performance value, adjusting a first scroll parameter for use by the client device;
   transmitting the adjusted first scroll parameter to the client device for use in a graphical user interface scroll on an application executing on the client device; and
   transmitting data to the client device in response to use of the adjusted first scroll parameter by the client device.

2. The method of claim 1, wherein the scroll log data also includes an identifier of a scroll feature of an application, wherein the performance value is computed for the scroll feature, and wherein the adjusting the first scroll parameter comprises adjusting a scroll parameter of the scroll feature.

3. The method of claim 1, wherein the scroll log data also includes metadata, the metadata including at least one of an operating system identifier, an operating system version, an application identifier, an application version, an identifier of a scroll feature of an application, and an identifier of the client device.

4. The method of claim 1, wherein adjusting the first scroll parameter includes adjusting a size of a scroll buffer zone, and wherein the scroll buffer zone is usable by the client device to cause the client device to transmit a request to the server to transmit data.

5. The method of claim 1, further comprising adjusting a second scroll parameter that indicates an amount of data to be transmitted by the server to the client device.

6. The method of claim 1, receiving the scroll log data comprises receiving the scroll log data from a plurality of client devices, and wherein computing the performance value comprises computing the performance value using the scroll log data from the plurality of client devices.

7. The method of claim 1, further comprising;
   generating a graphical console renderable on a computing device; and
   including information indicative of the scroll log data and the performance value.

8. The method of claim 1, wherein adjusting the first scroll parameter comprises performing a machine learning process.

9. A system comprising:
   a storage device; and
   one or more central processing units (CPUs) coupled to the storage device,
   wherein the storage device comprises a scroll log analyzer, and
   wherein, when executed by the one or more CPUs, the scroll log analyzer is configured to:
      receive scroll log data from a client device, wherein the scroll log data includes time stamps of load start events, load end events and lag events recorded by the client device;
      compute a performance value using the scroll log data;
      determine that the performance value is outside a limit;
      adjust a first scroll parameter for use in a graphical user interface scroll on an application executing on the client device, wherein the scroll log analyzer is configured to adjust the first scroll parameter by adjusting a size of a scroll buffer zone, and wherein the scroll buffer zone is usable by the client device to cause the client device to transmit a request to transmit data; and
      cause the adjusted first scroll parameter to be transmitted to the client device.

10. The system of claim 9, wherein the scroll log analyzer is configured to compute the performance value as a ratio of a number of scroll events that include a lag event to a total number of scroll events.

11. The system of claim 10, wherein the scroll log analyzer is configured to determine that the performance value is outside the limit through a determination that the ratio exceeds a threshold.

12. The system of claim 9, wherein the scroll log analyzer is configured to adjust a second scroll parameter that indicates an amount of data to be transmitted in response to use of the adjusted first scroll parameter by the client device.

13. The system of claim 9, wherein the scroll log analyzer is configured to receive the scroll log data from a plurality of client devices and to compute the performance value using the scroll log data from the plurality of client devices.

14. A computer program product for adjusting a configuration of a computer device, wherein the computer program product comprises:
- a computer readable storage medium having stored thereon:
  - first program instructions to receive scroll log data, wherein the scroll log data includes timestamps of load start events, timestamps of load end events, and timestamps of lag events recorded by a client device, wherein the timestamps of load start events indicate when the client device requests additional data, the timestamps of load end events indicate when the additional data has been received, and the timestamps of lag events indicates when the client device has reached an end of a buffer of data and is waiting on the additional data;
  - second program instructions to compute a performance value using the scroll log data;
  - third program instructions to determine that the performance value is outside a limit;
  - fourth program instructions to adjust a first scroll parameter for use in a graphical user interface scroll on an application executing on the client device;
  - fifth program instructions to cause the adjusted first scroll parameter to be transmitted to the client device; and
  - sixth program instructions to adjust a second scroll parameter that indicates an amount of data to be transmitted in response to use of the adjusted first scroll parameter by the client device.

15. The computer program product of claim 14, wherein the second program instructions are configured to compute the performance value as a ratio of a number of scroll events that include a lag event to a total number of scroll events.

16. The computer program product of claim 14, wherein the fourth program instructions are configured to adjust the first scroll parameter through adjustment of a size of a scroll buffer zone, and wherein the scroll buffer zone is usable by the client device to cause the client device to transmit a request to transmit data.

17. The computer program product of claim 14, wherein the first program instructions are configured to receive the scroll log data from a plurality of client devices and wherein the second program instructions are configured to compute the performance value using the scroll log data from the plurality of client devices.

* * * * *